United States Patent
Henderson (10) Patent No.: US 8,672,400 B2
(45) Date of Patent: Mar. 18, 2014

(54) FOLDABLE TABLE

(76) Inventor: Ronald John Henderson, Vernon (CA)

( * ) Notice: Subject to any disclaimer, the term of this patent is extended or adjusted under 35 U.S.C. 154(b) by 240 days.

(21) Appl. No.: 13/067,578

(22) Filed: Jun. 10, 2011

(65) Prior Publication Data

US 2012/0312198 A1 Dec. 13, 2012

(51) Int. Cl.
*A47B 83/02* (2006.01)

(52) U.S. Cl.
USPC .......................... 297/162; 297/160

(58) Field of Classification Search
USPC .................. 297/162, 160, 173, 135
See application file for complete search history.

(56) References Cited

U.S. PATENT DOCUMENTS

| | | | | |
|---|---|---|---|---|
| 624,812 | A * | 5/1899 | Hunzinger | 297/145 |
| 2,514,798 | A | 7/1950 | Rowe | |
| 2,582,703 | A | 1/1952 | Kirshbaum | |
| 3,367,713 | A * | 2/1968 | Krueger | 297/162 |
| 5,547,247 | A * | 8/1996 | Dixon | 297/145 |
| 5,857,745 | A | 1/1999 | Matsumiya | |
| 5,954,401 | A | 9/1999 | Koch et al. | |
| 5,992,798 | A | 11/1999 | Ferry | |
| 6,059,364 | A | 5/2000 | Dryburgh et al. | |
| 6,113,183 | A | 9/2000 | Koch et al. | |
| 6,119,980 | A | 9/2000 | Ferry | |
| 6,170,786 | B1 | 1/2001 | Park et al. | |
| 6,173,921 | B1 | 1/2001 | Neumann et al. | |
| 6,209,956 | B1 | 4/2001 | Dryburgh et al. | |
| 6,276,635 | B1 | 8/2001 | Ferry et al. | |
| 6,305,644 | B1 | 10/2001 | Beroth | |
| 6,494,536 | B2 | 12/2002 | Plant | |
| 6,523,903 | B1 * | 2/2003 | Rabenhorst | 297/411.32 |
| 6,598,934 | B1 | 7/2003 | Anderson | |
| 6,604,783 | B2 * | 8/2003 | Goodson | 297/170 |
| 6,692,069 | B2 | 2/2004 | Beroth et al. | |
| 6,742,842 | B2 | 6/2004 | Dowty | |
| 6,793,281 | B2 * | 9/2004 | Duerr et al. | 297/147 |
| 6,846,042 | B2 | 1/2005 | Hanson et al. | |
| 7,178,871 | B1 | 2/2007 | Round et al. | |
| 7,188,806 | B2 | 3/2007 | Beroth | |
| 7,318,622 | B2 | 1/2008 | Rezag et al. | |
| 7,360,742 | B2 | 4/2008 | Beroth | |
| 7,517,010 | B2 | 4/2009 | Saint-Jalmes et al. | |
| 7,798,072 | B2 * | 9/2010 | Becker et al. | 108/42 |
| 8,109,566 | B2 * | 2/2012 | Koh | 297/145 |
| 2003/0030307 | A1 * | 2/2003 | Richardson | 297/162 |

FOREIGN PATENT DOCUMENTS

| | | |
|---|---|---|
| CA | 586569 | 11/1959 |
| CA | 2083567 | 5/1994 |

* cited by examiner

*Primary Examiner* — David R Dunn
*Assistant Examiner* — Alexander Harrison
(74) *Attorney, Agent, or Firm* — Richard D. Okimaw (57) ABSTRACT

An apparatus and method for providing a work surface proximate to a seat in a vehicle. The apparatus comprises a base support connectable to the vehicle, a substantially planar member and a parallel linkage extending between the base support and the planar member for planar translational movement from a first position to a second position about an arcuate path defining a first plane. The first position is substantially proximate to the seat and the second position is above the seat and forward of the first position. The planar member is also pivotable about an axis parallel to the first plane away from the seat. The apparatus further comprises a support for selectably maintaining the planar member at a substantially horizontal orientation. The method comprises moving the planar member from the first position to the second position, rotating the planar member to the horizontal orientation and supporting the planar member with the support.

15 Claims, 7 Drawing Sheets

FOLDABLE TABLE

BACKGROUND OF THE INVENTION

1. Field of Invention

The present invention relates to tables in general and in particular to a method and apparatus for providing a working surface for use by an occupant in a vehicle.

2. Description of Related Art

Tables or other working surfaces are frequently desired in vehicles. Examples of such tables are commonly found in airplanes or other mass transit vehicles however several factors have limited their application and use in personal transportation vehicles, such as trucks and cars. The desirability of such tables has increased due to the increasing use of such vehicles for use as a work location.

Providing a vehicle mounted table as a work surface requires additional properties over conventional table trays as found in airplanes. In particular, such work surfaces must be substantially stronger to accommodate the weight of laptop computers and other work equipment that may be carried thereon across uneven surfaces such as unpaved roads, fields and construction sites. Additionally, such tables must be located at a position so as to not interfere with the operation of the vehicle when provided for the operator of the vehicle while still permitting ease of operation by the operator.

Many previous attempts to provide a working table have not be suitable for use in a work vehicle as they have been located in a position whereby they would interfere with the operation of the vehicle, if provided for the driver. Examples of such tables may be found in U.S. Pat. No. 6,598,934 to Anderson. Disadvantageously, the Anderson device is to be located over the lap of the seat occupant. In such position over the lap of a driver of a vehicle, the table would not only be substantially less usable due to the space constraints of the steering wheel, but it would also interfere with the proper operation of the vehicle as well as pose a safety hazard to the operator in the event of an air bag deployment.

SUMMARY OF THE INVENTION

According to a first embodiment of the present invention there is disclosed an apparatus for providing a work surface proximate to a seat in a vehicle. The apparatus comprises a base support connected to the vehicle, a substantially planar member and a parallel linkage extending between the base support and the planar member for planar translational movement from a first position to a second position about an arcuate path defining a first plane. The first position is substantially proximate to the seat and the second position is above the seat and forward of the first position. The planar member is also pivotable relative to the parallel linkage about an axis parallel to the first plane in a direction away from the seat. The apparatus further comprises a support for selectably maintaining the planar member at a substantially horizontal orientation when rotated about the axis.

The base support may be connected to the seat of the vehicle. The planar member may be supported by a top bracket which is connected to the parallel linkage. The planar member may be hinged to the top bracket along the axis.

The support may comprise a selectably lockable support linkage. The support linkage may extend between the top bracket and a bottom surface of the planar member. The support linkage may comprise first and second links pivotally connected to each other. The first and second links may be pivotable relative to each between a folded first position and a longitudinally aligned rigid second position. The first and second links may be biased to the second position The parallel linkage may comprise leading and trailing linkage arms. The trailing linkage arm may abut against the leading arm at the second position. The apparatus may further comprise a retaining lip for retaining the parallel linkage in a substantially vertical plane. The retaining lip may extend from the leading linkage arm.

According to a further embodiment of the present invention there is disclosed a method of providing a temporary work surface proximate to a seat in a vehicle. The method comprises translating a substantially planar member from a first position to a second position about an arcuate path along a first plane. The first position is substantially proximate to the seat while second position is above the seat and forward of the first position. The method further comprises rotating the planar member from the second position to a substantially horizontal orientation in a direction away from the seat and supporting the planar member in the substantially horizontal orientation with a selectably locking linkage.

The first plane may be substantially vertical. Rotating the planar member may comprise rotating the planar member about a substantially horizontal axis lying along the first plane.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention wherein similar characters of reference denote corresponding parts in each view.

DETAILED DESCRIPTION

Figure 1:
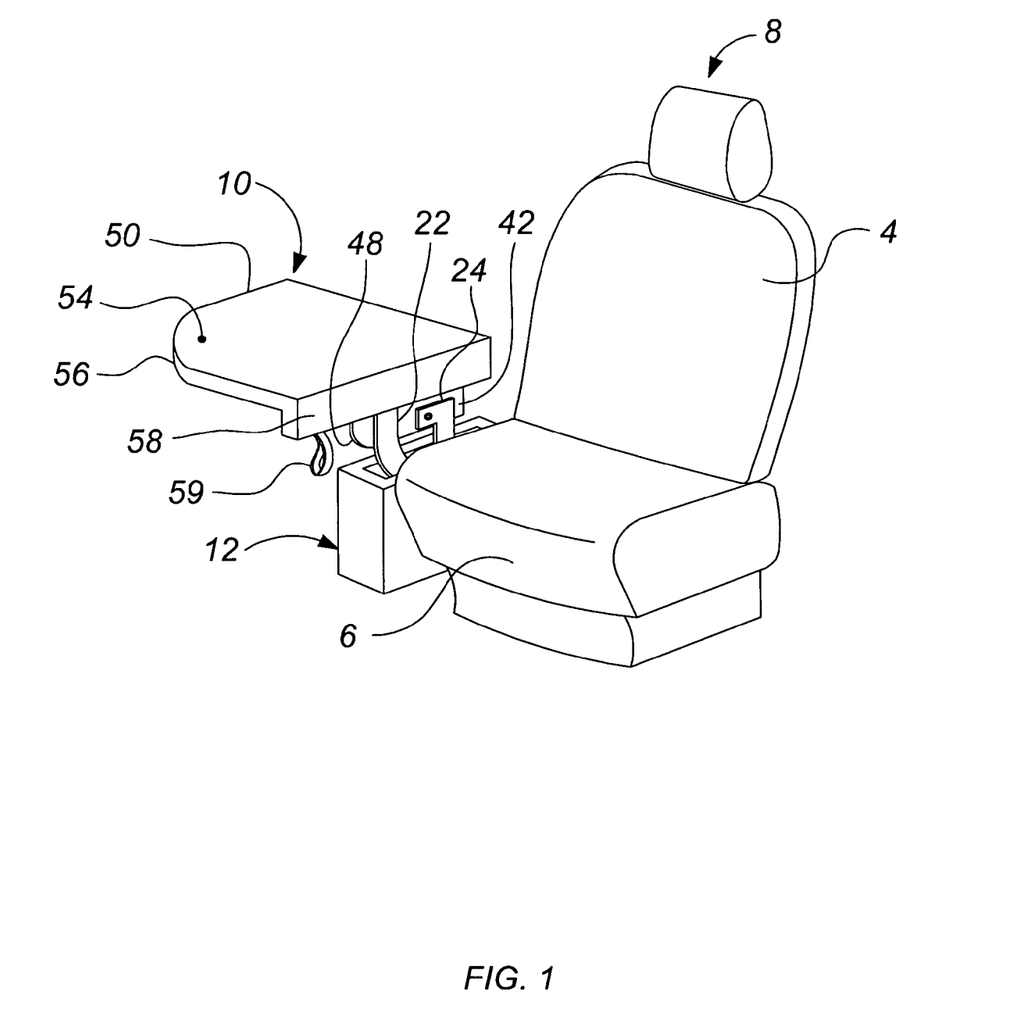
FIG. 1 is a perspective view of a seat table as applied in an open position proximate to and extending away from the seat according to a first embodiment of the present invention.
Figure 2:
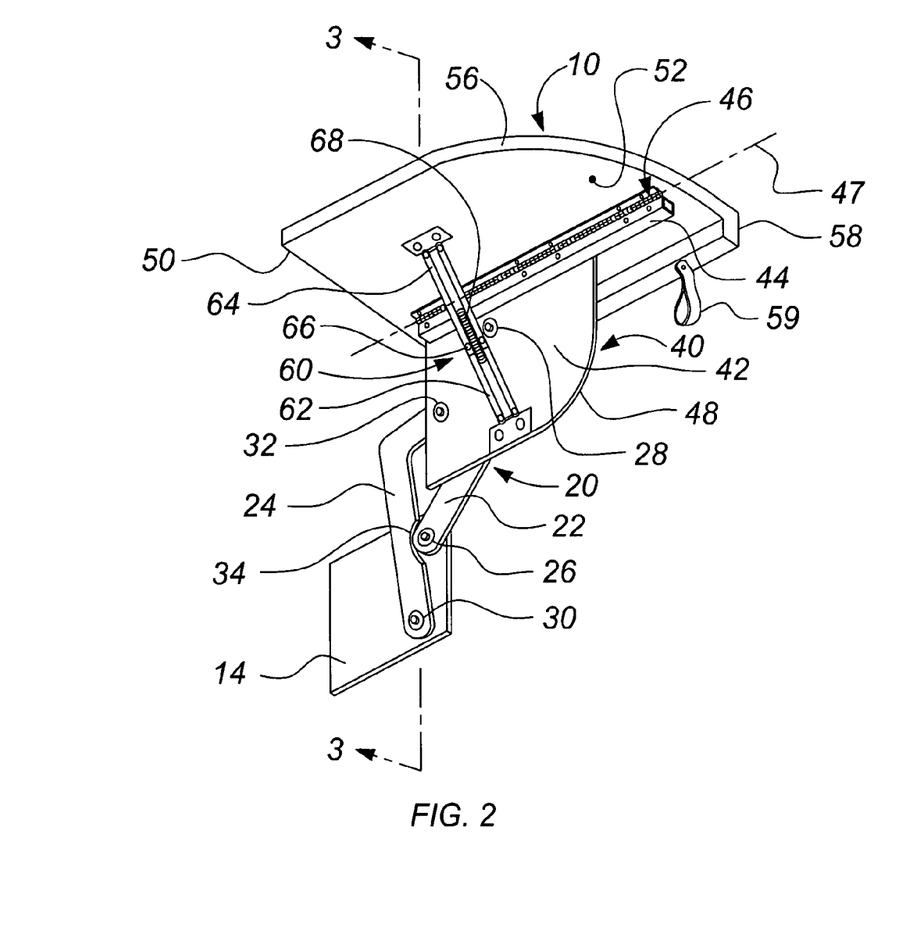
FIG. 2 is a perspective view of the seat table of FIG. 1.

Referring to FIGS. 1 and 2, an apparatus according to a first embodiment of the invention is shown generally at 10 as applied to and extending from a seat 8 within a vehicle. The seat 8 includes a sitting cushion portion 6 and a backrest 4. The apparatus 10 comprises a planar member or table top 50 pivotally connected to a top bracket 40. The top bracket 40 is translatable into a raised position by a parallel linkage 20 extending to a base support 14 or optionally to the vehicle or seat 8. As illustrated in FIG. 1, the apparatus may optionally include a storage compartment 12 located proximate to the seat 8 for use in storing the apparatus when not in use.

The base support 14 comprises a body adapted to be secured to the vehicle, seat 8 or within the storage compartment 12. It will be appreciated that for use with a storage compartment 12, the base support 14 may be incorporated into and form at least a portion of one of the walls of the storage compartment. In other embodiments, the base support 14 may form a portion of the vehicle or seat 8 such that the parallel linkage is pivotally connected directly thereto. The base support 14 provides a first mounting location for the parallel linkage 20.

The parallel linkage 20 comprises a first or leading linkage arm 22 and a second or trailing linkage arm 24. The leading linkage arm 22 is pivotally connected to the base support 14 at a bottom pivot 26 and to the top bracket 40 at a top pivot 28. The trailing linkage arm 24 is pivotally connected to the base support 14 at a bottom pivot 30 and to the top bracket 40 at a top pivot 32. The top and bottom pivots may be of any known type such as by way of non-limiting example bolts or other suitable fasteners, bushings or bearing s or the like. The leading and trailing linkage arms 22 and 24 are positioned to travel along a common plane defined by the paths of travel of the leading and trailing linkage arms 22 and 24. It will be appreciated that the leading and trailing linkage arms 22 and 24 in cooperation with the base support 14 and top bracket 40 form a four bar linkage as will be well understood in the art. Accordingly, it will be appreciated that the relative lengths of the leading and trailing linkage arms 22 and 24 may be adjusted so as to provide the desired angle of the table in the open position as will be more fully described below. The leading and trailing linkage arms 22 and 24 may be formed of any suitably strong materials, such as by way of non-limiting example, steel, stainless steel, aluminium, other metals and alloys thereof, composite materials, fibreglass or carbon fibre. As illustrated, the leading and trailing linkage arms may have substantially planar cross-sections so as to minimize the overall thickness of the apparatus when in a stored position.

As described above, the top bracket 40 is pivotally attached to the leading and trailing linkage arms 22 and 24. The top bracket 40 provides support for the table top 50 for translating the table top 50 from a stored to an extended position as will be described below. The top bracket 40 comprises a planar portion 42 and an elongate bar 44 at a top edge thereof. As illustrated, the planar portion 42 is substantially rectangular, however it will be appreciated that other shapes may be utilized as well. The elongate bar 44 supports a hinge 46, such as by way of non-limiting example, a piano hinge for pivotally supporting the table top 50 about axis 47. The elongate bar 44 spaces the table top 50 from the planar portion 42 when the apparatus is in a folded or stored position so as to provide for sufficient space to contain the support linkage 60 between the table top 50 and the planar portion 42. In operation, the elongate bar 44 may have a width of ½ inches (13 mm) or more depending upon the size and strength requirements of the support linkage although it will be appreciated that smaller distances may also be utilized for tables designed for light use. The top bracket 40 may be formed of any suitable material having sufficient strength to support the table top 50 without undue deflection, such as by way of non-limiting example, steel, stainless steel, aluminium, other metals and alloys thereof or composite materials. As illustrated, the planar portion 42 may also have a rounded front corner 48 so as to facilitate easier removal from the storage compartment 12.

Figure 5:
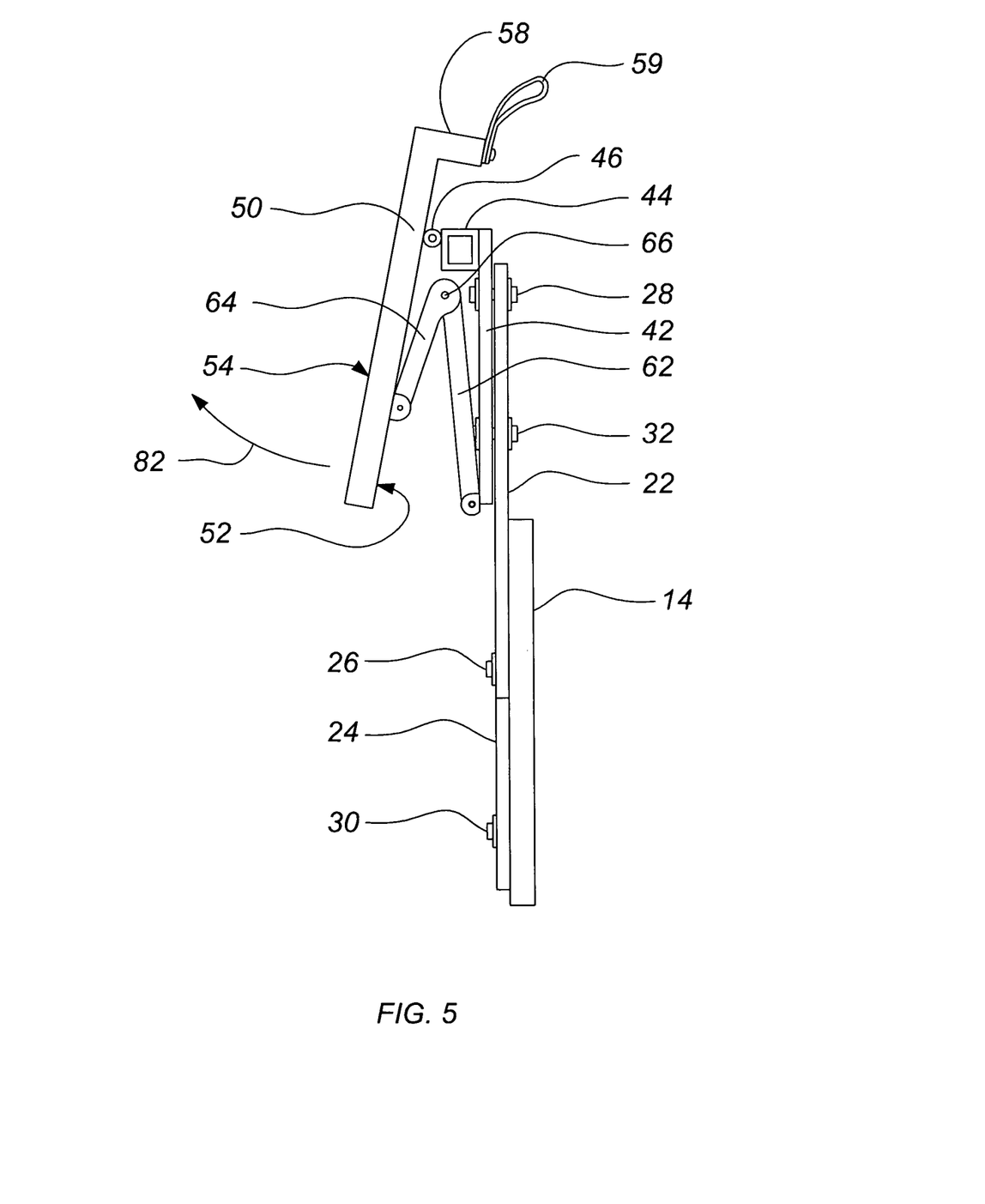
FIG. 5 is a front cross sectional view of the apparatus of FIG. 1 as taken along the line 5-5 in a first or closed position.

As described above, the table top 50 is pivotally connected to the top bracket by the hinge 46 at a bottom surface thereof. The hinge permits the table top to be rotated relative to the top bracket 40 between a substantially vertical position as illustrated in FIG. 5 to a substantially horizontal position as illustrated in Figure and described in greater detail below. The table top 50 includes a top surface 54 which may be substantially flat so as to provide the user with an adequate work surface. As illustrated the table top 50 may also include a rounded corner generally indicated at 56 so as to facilitate movement of the apparatus out of the storage compartment 12 or to avoid any other object within the vehicle during deployment. It will also be appreciated that although the table top 50 is illustrated as substantially rectangular, any other shape may be utilized as well depending upon the space constraints within the vehicle and the needs of the user. The table top 50 may be formed of any suitable material, such as by way of non-limiting example, wood, plastic or metal and may have a thickness sufficient to support the intended weight of the articles to be used thereon. Optionally, the table top 50 may include a side flange 58 located proximate to the top bracket 40 as illustrated. The side flange may be sized to cover an opening within top of the storage compartment 12 so as to enclose and seal the apparatus within the storage compartment when not in use. The side flange 58 may have any suitable surface treatment, such as by way of non-limiting example, wood, metal or plastic to match the remainder of the table top or be covered with upholstery to match the storage compartment 12 or other surface treatments within the vehicle. As illustrated, the side flange 58 may also include a pull strap 59 extending therefrom so as to permit a user to more easily pull the table top 50 out of the storage compartment 12.

Figure 6:
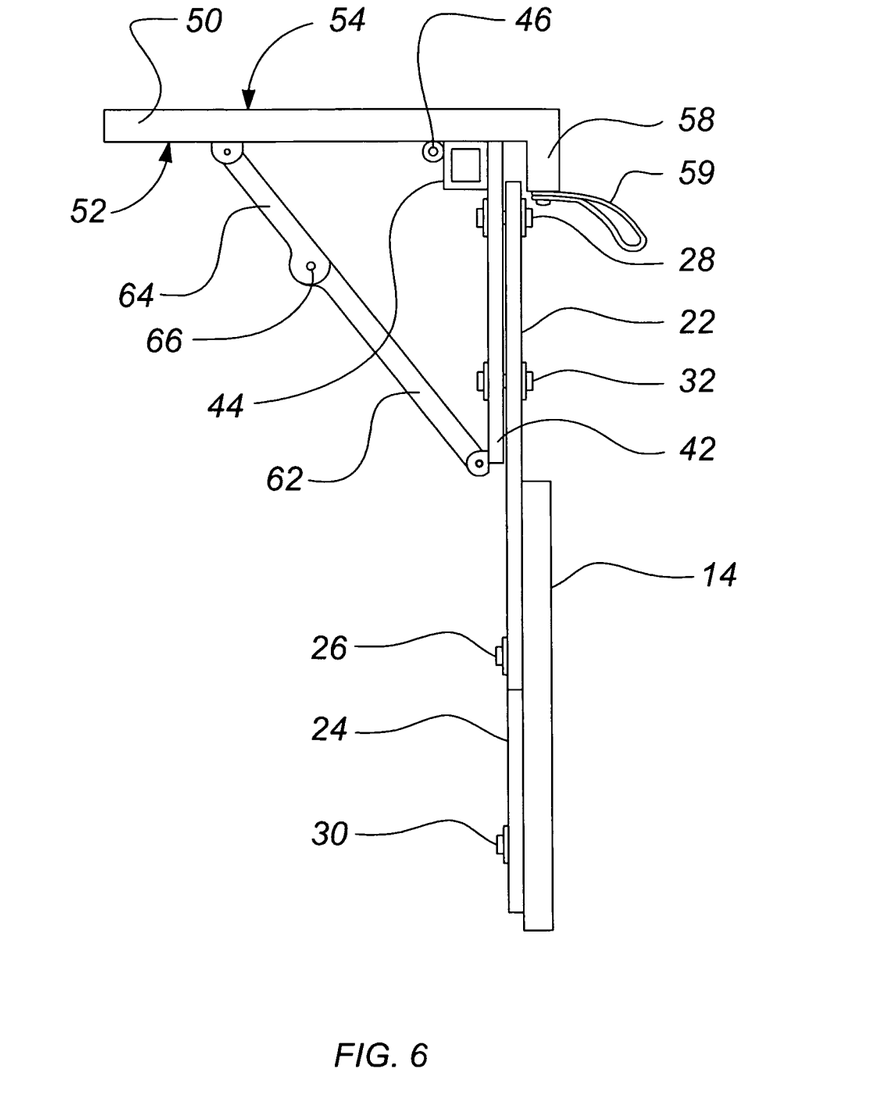
FIG. 6 is a front cross sectional view of the apparatus of FIG. 1 as taken along the line 5-5 in a second or open position.

The table top 50 is supported in its open position as illustrated in FIG. 6 by a support linkage 60. The support linkage 60 extends angularly between the planar portion 42 of the top bracket 40 and the bottom surface 52 of the table top 50. The support linkage 60 comprises first and second support links 62 and 64, respectively which are pivotally connected to each other at a center pivot 66. The first support link 62 extends from the planar portion 42 to the center pivot 66 while the second support link 64 extends from the center pivot 66 to the bottom surface 52 of the table top.

In operation, the first and second support links 62 and 64 may be either folded relative to each other in a first position as illustrated in FIG. 5 or longitudinally extended relative to each other in a second position as illustrated in FIG. 6. In the extended position, the first and second support links 62 and 64 are longitudinally rigidly connected so as to provide a brace or support for the table top 50. In moving from the folded to the extended position, the first and second support links 62 an 64 may be rotated slightly past a longitudinal alignment with each other to abut against rotation stops such that any further compressive force upon the support linkage 60 will further engage the first and second support links 62 and 64 upon the rotation stops and thereby resist movement back to the folded position according to known methods. In other embodiments, the center pivot 66 may be eccentrically located relative to the first and second support links 62 and 64 located so as to retain the first and second support links 62 and 64 in alignment under an axial compressive force. The first and second support links 62 and 64 may be thereafter moved from the extended to the folded position by pressing on center pivot 66 to break the longitudinal alignment thereof. The support linkage 60 also includes a spring 68 or other suitable means for biasing the support link to the second or extended position according to known means. The support linkage 60 may be formed of any known and suitably strong material, such as by way of non-limiting example, metals or composite materials.

Figure 3:
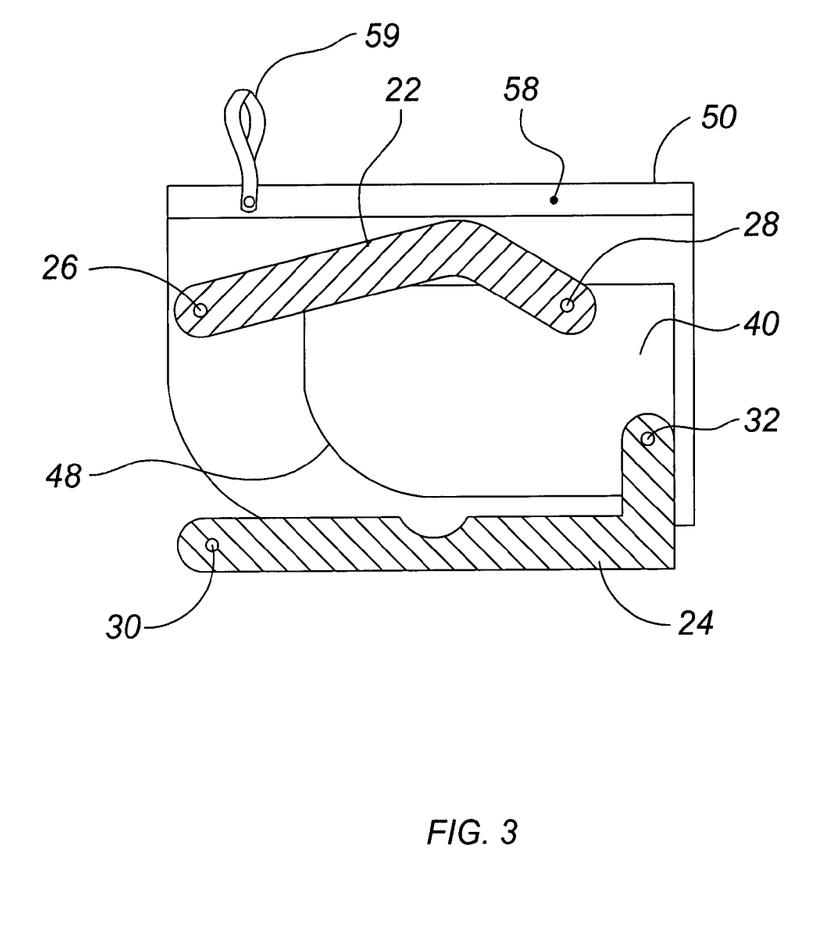
FIG. 3 is a side cross sectional view of the apparatus of FIG. 1 as taken along the line 3-3 in a first or stowed position.
Figure 4:
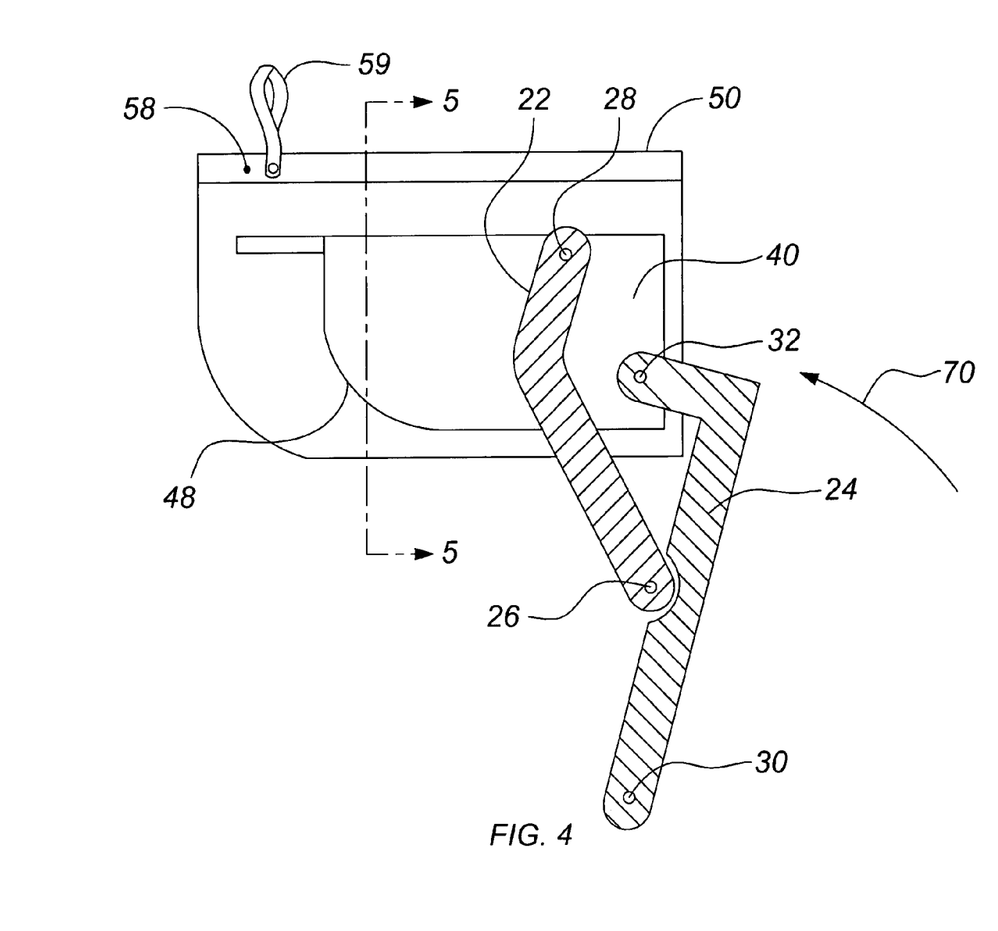
FIG. 4 is a side cross sectional view of the apparatus of FIG. 1 as taken along the line 3-3 in a second or elevated position.

With reference to FIGS. 3 and 4, the apparatus 10 may be stowed within the storage compartment 12 in a folded or first position as illustrated in FIG. 3. The apparatus 10 in FIGS. 3 and 4 is illustrated without either the storage compartment 12 or base support 14 in FIGS. 3 and 4 for clarity of the movements of the leading and trailing linkage arms 22 and 24. When desired for use by a user, the table top 50 may be lifted upwards and forward in a direction generally indicated at 70 to a raised or second position as illustrated in FIG. 4. The forward movement of the table top may be limited by engaging the leading and trailing linkage arms 22 and 24 against each other such that end of the leading linkage arm 22 is received within a corresponding notch or aperture 34 of the trailing linkage. It will be appreciated that other movement stops may be provided for either one of or both of the leading and trailing linkage arms 22 and 24 as are known in the art. In the raised position, the leading and trailing may be angularly oriented such that the top pivots 28 and 32 are located further ahead of the bottom pivots 26 and 30 such that any load placed upon the table top 50 will server to further engage the linkage arms within a provided rotation stop as opposed to returning the table top back to the folded position.

Figure 7A:
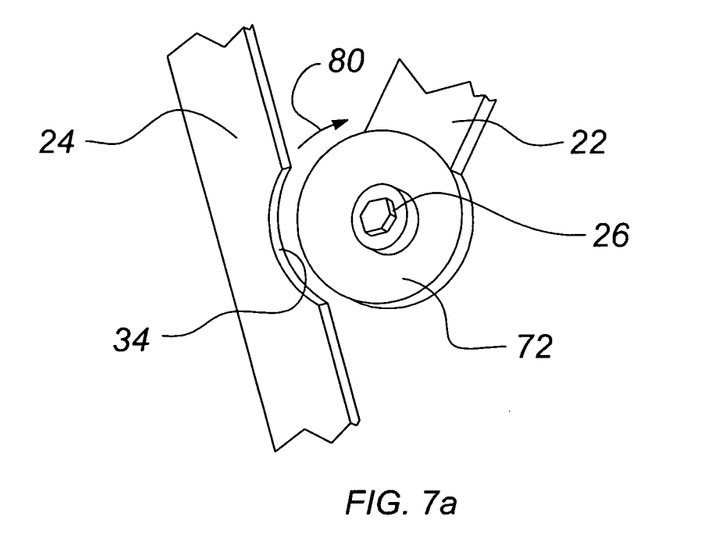
FIG. 7a is a detailed view of a linkage retainer according to a first embodiment of the present invention.
Figure 7B:
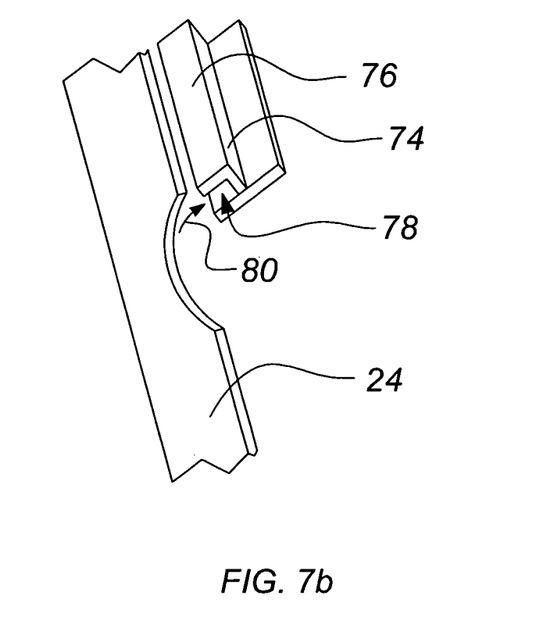
FIG. 7b is a detailed view of an alternative linkage retainer according to a further embodiment of the present invention.

As illustrated in FIGS. 7a and 7b, link retainers may also be utilized to retain either one of or both of the leading and trailing linkage arms proximate to the base member so as to provide additional strength to the apparatus in a raised position. As illustrated in FIG. 7a, the retainer may comprise an oversized disk 72 located on the leading linkage arm 22 and being adapted to overly at least a portion of the trailing linkage arm 24 when the trailing linkage arm 24 is moved thereunder in a direction generally indicated at 80. Optionally, the base support 14 or storage compartment 12 may include a raised ridge 74 as illustrated in FIG. 7b having a top lip portion 76 adapted to overly at least a portion of either one of the leading or trailing linkage arms 22 or 24 (in FIG. 7b, the trailing linkage arm 24 is illustrated as being received therein). As illustrated in FIG. 7b, the raised ridge 74 and top lip 76 form a pocket 78 into which the trailing linkage arm 24 may be received when the trailing arm is moved therein in a direction generally indicated at 80. It will also be appreciated that retainers similar to those illustrated in either FIG. 7a or 7b may also be secured to the base support 14 or another portion of the storage compartment 12 so as to engage with the leading linkage arm 22 and maintain it proximate thereto.

As illustrated in FIGS. 3 and 4, the parallel linkage 20 provides a means for translational movement of the table top 50 between the stowed and raised positions as illustrated in FIGS. 3 and 4. During such motion, there is limited rotation of the table top as would be provided for by a pivot type connection of the table top from a stowed to a raised potion. It will be appreciated that providing translational movement of the table top results in a stronger more stable table top that is better adapted to resist end deflections of the table top under load due to the spaced apart relation of the two top pivots 32 and 28. It will also be appreciated that the link retainers as illustrated in FIGS. 7a and 7b will further strengthen the apparatus to lateral loads placed upon the table top by maintaining the parallel linkage proximate to the base support 14.

Turning now to FIGS. 5 and 6, the table top may be lifted from a substantially vertical to a substantially horizontal orientation after it has been raised as illustrated in FIG. 4. As the table top 50 is rotated by the user in a direction generally indicated at 82, the first and second support links 62 and 64 will be rotated and brought into alignment with each other as illustrated in FIG. 6. In such position, the first and second support links 62 and 64 will lock to form a longitudinally rigid support linkage 60 to maintain the table top 50 in a substantially horizontal orientation.

To return the apparatus from a deployed position as illustrated in FIG. 6 to a stowed position as illustrated in FIG. 3, the center pivot 66 of the support linkage 60 is first pressed inwardly by the user to unlock the support member. Thereafter the table top 50 is permitted to be rotated downwardly to rest proximate to the planar portion 42 and thereafter translated about the parallel linkage both backwards and downwards into the storage compartment or to be proximate to the bottom support. It will be appreciated that the apparatus, as folded and stored within the storage compartment 12, or otherwise in a folded arrangement outside of a storage compartment 12 will have a narrow space requirement and may therefore be located between seats of a vehicle without unduly interfering with the adjacent seat. Optionally, the storage compartment 12 may be incorporated into an existing storage of a vehicle.

While specific embodiments of the invention have been described and illustrated, such embodiments should be considered illustrative of the invention only and not as limiting the invention as construed in accordance with the accompanying claims.

What is claimed is:

1. An apparatus for providing a work surface proximate to a seat in a vehicle, the apparatus comprising:
   a base support connectable to said vehicle;
   a substantially planar member;
   leading and trailing linkage arms extending between said base support and said planar member for planar translational movement from a first position to a second position about an arcuate path defining a first plane, wherein said first position is substantially proximate to said seat and said second position is above said seat and forward of said first position such that said planar member includes a top edge at said first position which remains at a top edge thereof at said second position, said planar member being pivotable relative to said leading and trailing linkage arms about an axis parallel to said first plane in a direction away from said seat; and
   a support for selectably maintaining said planar member at a substantially horizontal orientation when rotated about said axis.

2. The apparatus of claim 1 wherein said base support is connected to said seat of said vehicle.

3. The apparatus of claim 1 wherein said planar member is supported by a top bracket, said top bracket being connected to said leading and trailing linkage arms.

4. The apparatus of claim 3 wherein said planar member is hinged to said top bracket along said axis.

5. The apparatus of claim 1 wherein said support comprises a selectably lockable support linkage.

6. The apparatus of claim 5 wherein said support linkage extends between said top bracket and a bottom surface of said planar member.

7. The apparatus of claim 6 wherein said support linkage comprises first and second links pivotally connected to each other.

8. The apparatus of claim 7 wherein said first and second links are pivotable relative to each between a folded first position and a longitudinally aligned rigid second position.

9. The apparatus of claim 8 wherein said first and second links are biased to said second position.

10. The apparatus of claim 1 wherein said trailing linkage arm abuts against said leading arm at said second position.

11. The apparatus of claim 1 further comprising a retaining lip for retaining said leading and trailing linkage arms in a substantially vertical plane.

12. The apparatus of claim 11 wherein said retaining lip extends from said leading linkage arm.

13. A method of providing a temporary work surface proximate to a seat in a vehicle, the method comprising:

translating a substantially planar member from a first position to a second position about an arcuate path along a first plane, wherein said first position is substantially proximate to said seat and said second position is above said seat and forward of said first position such that said planar member includes a top edge at said first position which remains at a top edge thereof at said second position;

rotating said planar member from said second position to a substantially horizontal orientation in a direction away from said seat; and supporting said planar member in said substantially horizontal orientation with a selectably locking linkage.

14. The method of claim 13 wherein said first plane is substantially vertical.

15. The method of claim 13 wherein said rotating said planar member comprises rotating said planar member about a substantially horizontal axis lying along said first plane.

* * * * *